March 31, 1931. R. R. SEARLES 1,798,906
SPRING SHACKLE
Original Filed Aug. 1, 1924
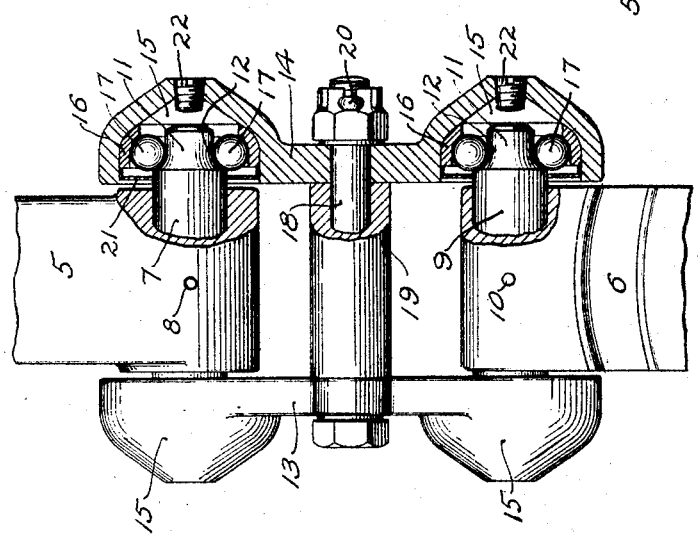
INVENTOR
Raymond R. Searles
BY
Mitchell Brothers
ATTORNEYS.

Patented Mar. 31, 1931

1,798,906

UNITED STATES PATENT OFFICE

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING SHACKLE

Application filed August 1, 1924, Serial No. 729,444. Renewed February 11, 1928.

My invention relates to a spring shackle.

Heretofore springs of motor vehicles and the like have been connected to the frame thereof by means of shackle bolts or pins in plain bearings. In such constructions the wear on the bolts themselves or on the bearing bushings has been excessive and unless frequent lubrication is resorted to squeaks often develop. It has been proposed to provide what may be termed anti-friction spring shackles but so far as I am aware such anti-friction bearings as now made have been quite complicated and expensive to make.

It is the general object of my invention therefore to provide an exceedingly simple anti-friction spring shackle for connecting the spring of a motor vehicle or the like, to the frame and one which may be made relatively cheaply.

It is another object to provide an antifriction bearing spring shackle, which shall be non-adjustable, so as to facilitate free interchangeability of parts and assure proper assembly independently of the skill or judgment of the mechanic assembling the parts.

Other minor objects and features of invention will be apparent as the specification proceeds.

The invention will be described by reference to the accompanying illustrative drawings in which:

Fig. 1 is an end view in partial section of one form of my improved spring shackle;

Fig. 2 is a side view of the spring shackle shown in Fig. 1;

Fig. 3 is a fragmentary sectional view of a slightly modified form.

5 indicates the rear end of the frame of a motor vehicle or the like, while 6 indicates the rear end of a spring for the same. The frame 5 and spring 6 are connected together by means of my improved spring shackle which will now be described.

The frame 5 is provided with an eye or bore for receiving what may be termed a shackle bolt or pin 7, the ends of which project from opposite sides of the frame. The pin 7 may be shrunk in the end of the frame or the pin may be held in place otherwise as by means of a key or set screw 8. A second shackle pin 9 may be similarly held on the end of the spring 6 and here also a set screw or similar device 10 may be used. In the form shown, the pins 7 and 9 are symmetrical at opposite ends and are duplicates of each other, so that a description of one end will suffice for all. In the illustrative example herein disclosed the projecting end 11 of each pin has a raceway for anti-friction members thereon and in the form shown in Fig. 1, the raceways 12—12 are formed directly on the surface of the pin. As shown each pin end is reduced or is of progressively smaller diameter toward the outer end so as to form an inclined seat directly upon the pin end which may thus form one race of an anti-friction bearing to take both radial and thrust loads.

A connecting shackle or link member connects the end of the spring and the frame and is preferably formed in two parts or cheek plates 13—14 which may be duplicates of each other. The shackle parts 13—14 are provided at opposite ends with recesses or housings 15—15 and on the inside of each of these recesses is a raceway for anti-friction bearing members complementary to the raceways on the ends of the shackle pins. If desired, the raceways may be formed in separate cup rings 16—16 seated in the housings. The raceway in each bearing housing or cup forms the outer raceway complementary to that on each pin end and these raceways together with the anti-friction members, such as balls 17—17, form thrust as well as radial bearings which support the frame from the spring. The shackle plates 13—14 which may be cast or drop forged are preferably relatively thick along the part intermediate the cups so as to withstand the strains to which they are subjected when in use. The two shackle parts 13—14 must be suitably held together and I preferably employ a single through bolt 18 passing through the body of each of the cheek plates 13—14 and held in place by a nut. It will be seen that the bolt 18 external of and independent of the shackle pins 7—9, being interposed between these pins, serves to hold the ends of the shackle parts 13—14 in proper assembled relation with the anti-friction members on the ends of the shackle pins. The anti-friction members 17—17 may themselves serve to properly space the cheek plates 13—14, but I prefer to provide additional spacing means and to that end I have shown a spacer sleeve 19 interposed between the sides of the parts 13—14 and surrounding the connecting through bolt 18. When the shackle parts are properly set up so as to give just the proper bearing pressure on the anti-friction members the cotter pin 20 may be inserted to prevent unscrewing of the nut on the bolt 18.

It will be seen that if the parts should become loose due to wear, it will only be necessary to set up slightly on the nut on bolt 18 so as to bring the two shackle parts 13—14 closer together so as to again secure a proper fit with the anti-friction members. If a spacer such as 19 be employed it may be necessary to grind or otherwise take off a small portion thereof, so as to permit the two shackle parts 13—14 to be brought closer together.

It will be noted that with spacing means such as the sleeve 19 the shackle construction is non-adjustable. This feature of non-adjustability is of considerable importance from the manufacturing and assembly point of view. The outer races 16 are definitely held against adjustment in the shackle links, and the complementary raceways such as 11 on the bearing pins may be spaced a definite distance apart. The spacers such as 19 are accurately formed of definite length, so that when the links are drawn up rigidly against the spacer the anti-friction bearing members such as the balls 17 will just fit the bearing raceways as desired. Thus, by making the parts so as to provide for a non-adjustable construction, all parts will be freely interchangeable, and the fit of the antifriction bearing members on their raceways is not dependent upon the skill or judgment of the mechanic who assembles the spring end connections.

Some form of closure such as the sheet metal closure plate 21, may be provided for the outer ends of the recess 15 in order to provide a completely enclosed housing for the bearing elements, so as to exclude dust and also to provide a proper receptacle for a lubricant. If desired, lubricant holes may be provided in the cheek plates so as to permit introduction of lubricant into the housings or recesses and such holes would ordinarily be closed as by means of plugs 22—22. It should be observed, however, that with anti-friction bearings providing rolling contact and with spacious lubricant reservoirs, lubrication will be required very infrequently and that friction will be reduced to a minimum.

In the modification shown in Fig. 3 the construction is substantially the same as that just described except that the raceways for anti-friction members on the shackle pin 25 instead of being formed directly on the end of the pin are formed on separate bearing rings such as 26. In the disclosed form, the bearing ring 26 and the outer bearing ring 27 together with the anti-friction members 28—28 form what is termed a radial bearing. In this case also closure means such as the disk or disks 29 serve to enclose the housing so as to exclude dust and retain lubricant. The action of the two forms is substantially the same.

By means of the improved spring shackle disclosed, it is possible to reduce friction to a minimum and it is possible to effectively and constantly lubricate the bearing surfaces so that squeaks will not develop, and since a proper lubricant reservoir is provided and since friction is so greatly reduced fresh lubricant need not be introduced except at long intervals.

The side thrusts of the motor vehicle when in use will be taken up by the anti-friction members themselves and there will be substantially no rubbing surfaces in contact with each other.

Another important feature is the simplicity with which the elements may be assembled and held together by simple means, such as the single through bolt 18 which will ordinarily suffice.

The expensive operation of drilling oil holes in the shackle bolts or pins, as is necessary with ordinary shackle bolts, is avoided and solid imperforate steel rod may be employed in carrying out my invention. By forming the raceways directly upon the pins instead of on separate rings secured on the pins, the cost of production is materially reduced and there are no separate race rings to give trouble in sliding or turning on the pin ends.

While the invention has been illustrated as applied to the rear ends of the spring and motor vehicle frame, it is equally applicable for use on the opposite or inner hinge end of the spring.

While the invention has been described in some detail I do not wish to be limited to the forms shown since changes in construction and arrangement may be made within the scope of the invention as defined in the appended claims.

I claim:

1. In a spring shackle, shackle plates having bearing seats for anti-friction bearing members at opposite ends thereof, means for securing said shackle plates together, shackle pins extending between said shackle plates, said pins having bearing seats for anti-friction bearing members formed directly thereon, anti-friction bearing members interposed between the seats on said shackle plates and pins, said bearing seats on said shackle plates and pins being inclined whereby both radial and thrust loads will be taken by said anti-friction bearing members.

2. In the combination defined in claim 1, said means for securing said shackle plates together comprising a bolt extending through said plates at points intermediate the bearing seats thereon.

3. In the combination defined in claim 1, said means for securing said shackle plates together comprising a bolt extending through said plates at points intermediate the bearing seats thereon, and a sleeve surrounding said bolt and bearing against the inner sides of said plates for assisting in spacing the same apart.

4. In a spring shackle, a shackle pin to be secured to a vehicle frame and project beyond the sides thereof, a second pin to be secured to a vehicle spring and project beyond the sides thereof, said pins having raceways for anti-friction bearing members formed directly thereon at the projecting ends, shackle links having inwardly open bearing cups at opposite ends, that portion of each shackle link between the bearing cups being substantially thicker than the walls of the cups thereon, anti-friction bearing members interposed between said raceways on said pins and said bearing cups, the bearing surfaces for said anti-friction bearing members on said pins and cups being inclined whereby both radial and thrust loads will be taken by said cups, and means for securing said shackle links together.

5. In a spring shackle, a shackle pin to be secured to a vehicle frame and project beyond the sides thereof, a second pin to be secured to a vehicle spring and project beyond the sides thereof, the projecting ends of said pins being reduced in diameter so as to form thrust bearing raceways for anti-friction bearing members directly thereon, shackle plates having thrust bearing raceways complementary to the raceways on said pins, anti-friction bearing members interposed between the raceways on said pins and shackle plates, and means for securing said shackle plates together.

6. In a spring shackle, shackle plates having bearing seats for anti-friction bearing members at opposite ends thereof, means for securing said shackle plates together, shackle pins extending between said shackle plates, said pins having bearing seats for anti-friction bearing members formed directly thereon, said seats on said pins tapering outwardly to smaller diameters toward the ends of the pins, anti-friction bearing members interposed between the seats on said shackle plates and pins, said bearing seats on said shackle plates being inclined whereby both radial and thrust loads will be taken by said anti-friction bearing members.

7. In a spring shackle, shackle plates having bearing seats for anti-friction bearing members at opposite ends thereof, means for holding said shackle plates in spaced relation to each other, shackle pins extending between said shackle plates, said pins having bearing seats for anti-friction bearing members formed directly thereon, anti-friction bearing members interposed between the seats on said shackle plates and pins, said bearing seats on said shackle plates and pins being inclined whereby both radial and thrust loads will be taken by said anti-friction bearing members.

8. In a means for connecting a vehicle frame and spring, pin means to be secured to a spring end, said pin means having reduced ends forming inclined anti-friction bearing member raceways directly thereon, a pair of side plates having inclined seats for anti-friction bearing members and complementary to the seats on said pin means, and anti-friction bearing members interposed between the seats on said pin means and said side plates, whereby both radial and end thrust loads will be taken by said anti-friction bearing members, said side plates being secured to a vehicle frame.

9. In a means for connecting a vehicle frame and spring, pin means to be secured to a vehicle frame, said pin means having reduced ends forming inclined anti-friction bearing member raceways directly thereon, a pair of side plates having inclined seats for anti-friction bearing members and complementary to the seats on said pin means, and anti-friction bearing members interposed between the seats on said pin means and said side plates, whereby both radial and end thrust loads will be taken by said anti-friction bearing members, said side plates being secured to a vehicle spring.

10. In a means for connecting a vehicle frame to a vehicle spring, pin means to be secured to one of said members, plates secured to the other of said members, said pin means having reduced ends forming inclined anti-friction bearing member raceways directly thereon, said side plates having inclined anti-friction bearing member raceways thereon and complementary to the anti-friction bearing member raceways on said pin means, and anti-friction bearing members interposed between the seats on said pin means and said side plates, whereby both radial and end thrust loads may be taken by said anti-friction bearing members.

11. In a means for connecting a vehicle frame to a vehicle spring, pin means to be secured to one of said members, plates pivotally secured to the other of said members, said pin means having reduced ends forming inclined anti-friction bearing member raceways directly thereon, said side plates having inclined anti-friction bearing member raceways thereon and complementary to the anti-friction bearing member raceways on said pin means, and anti-friction bearing members interposed between the seats on said pin means and said side plates, whereby both radial and end thrust loads may be taken by said anti-friction bearing members.

12. In a spring shackle construction, pin means having bearing raceways thereon spaced a definite distance apart, shackle links having fixed antifriction bearing member raceways thereon complementary to the raceways on said pin means, antifriction bearing members between the raceways on said pin means and on said shackle links, and means for positively holding said shackle links a single definite distance apart independently of the fit of said antifriction bearing members on said raceways, the raceways on said pin means and shackle links being inclined whereby both radial and thrust loads will be carried by said antifriction bearing members.

13. In a spring shackle construction, a pair of opposed shackle links having spaced apart antifriction bearing member raceways thereon, means having antifriction bearing member raceways thereon complementary to the raceways on said shackle links and spaced a single definite distance apart, antifriction bearing members between the raceways on said means and on said shackle links, said raceways being inclined whereby both radial and end thrust loads will be carried by said antifriction bearing members, and means for holding the raceways on said shackle links a single definite distance apart independently of the fit of said antifriction bearing members on said raceways, whereby said shackle construction will be non-adjustable.

14. In a spring shackle construction, means to be carried by a frame and having antifriction bearing member raceways thereon spaced a single definite distance apart, means to be carried by a spring end having antifriction bearing member raceways thereon spaced a single definite distance apart, shackle links having fixed antifriction bearing member raceways thereon complementary to the raceways carried by said means on said frame and spring, antifriction bearing members interposed between the raceways on said shackle links and said means on said spring and frame, said raceways being inclined whereby both radial and thrust loads are carried by said antifriction bearing members, means for definitely spacing said shackle links apart a single definite distance independently of the fit of said antifriction bearing members on said raceways, and means for holding said links together so definitely spaced apart.

15. In a spring shackle construction, a frame part having a bore therein, a spring having an eye therein, shackle pins tightly fitting in said bores and projecting beyond the sides of said spring and frame, means engaging said spring and frame and said shackle pins for preventing longitudinal movement of said pins in said frame and spring, spring shackle links for connecting the pin ends of said frame and spring, antifriction bearing members between said pin ends and said shackle links, and means for securing said links together.

16. In a spring connection, a member having a bore therein, shackle pin means fitting said bore and having parts projecting beyond the sides of said member, means engaging said shackle pin means and said member having a bore for preventing longitudinal movement of said shackle pin means, opposed side members, and antifriction bearing members interposed between the projecting ends of said pin means and said side members, for the purpose described.

17. In a spring shackle construction, means to be secured to a spring and frame, shackle members for connecting the spring and frame, antifriction bearing members interposed between said shackle members and said means to be secured to a spring and frame, and means intermediate the ends of said shackle members for securing the same together in spaced relation, said shackle members being enlarged intermediate the ends thereof at the zone of said securing means, said enlargement extending in a direction at right angles to said spacing and securing means.

18. In a shackle construction, means to be secured to a frame and spring, shackle links having bearing seats at the ends thereof, antifriction bearing members interposed between said bearing seats and said means to be secured to a frame and a spring, a tubular spacing member abutting the insides of said shackle links intermediate the ends thereof for definitely spacing the same apart, said shackle links having apertures therein in line with the bore through said tubular member, and a through-bolt extending through said apertures in said shackle links and through said tubular spacing member for holding the latter in place and holding said shackle members together and against said tubular spacing members, said shackle members being enlarged in the region of said apertures therethrough, said enlargement extending in a direction transversely of said apertures.

19. In a spring shackle construction, means to be secured to a frame and a spring, shackle links having bearing seats at the ends thereof, antifriction bearing members interposed between said bearing seats and said means to be secured to a frame and spring, means for holding said links to each other in definitely spaced apart relation, said means including spacer means between said links and means extending through said links, and a readily detachable nut engaging at least one of said means extending through said links for drawing said links together, whereby said links may be readily held together and detached from each other, said securing and spacer means being means separate from both of said shackle links.

20. In a spring shackle construction, means to be secured to a frame and spring, a pair of shackle links having bearing seats at opposite ends thereof, antifriction bearing members interposed between said seats and said means to be secured to a frame and spring, a tubular spacer sleeve intermediate the ends of said links and abutting the insides thereof for definitely spacing said links apart, said links having apertures therethrough in alignment with the bore through said tubular spacer sleeve, a headed through-bolt extending through said apertures and through said tubular spacer for holding said spacer in place against both links, and a nut threaded on said through-bolt for drawing said links toward each other and against said tubular spacer, said tubular spacer being a member separate from said shackle links.

21. In a spring connection, a member having a bore therein, pin means in said bore and having parts extending beyond the ends thereof, the projecting ends of said pin means being of reduced diameters, side members, antifriction bearing members interposed between said side members and said pin means at the reduced end portions thereof, and dust ring means carried by said side members and extending over said pin means at points inwardly beyond said reduced ends.

22. In a spring connection, a member having a bore therein, pin means in said bore and extending beyond the ends thereof, said pin means being of substantially uniform diameter throughout the major portion of the length thereof, said pin means having reduced ends, members having bearing seats, antifriction bearing members interposed between said seats and said pin means at the reduced ends thereof, and dust rings carried by said members having bearing seats and extending over said pin means at portions thereof of said substantially uniform diameter.

RAYMOND R. SEARLES.